Aug. 18, 1925.
H. L. LAMBERT
AUTOMOBILE TRANSMISSION
Filed Sept. 12, 1924
1,550,548
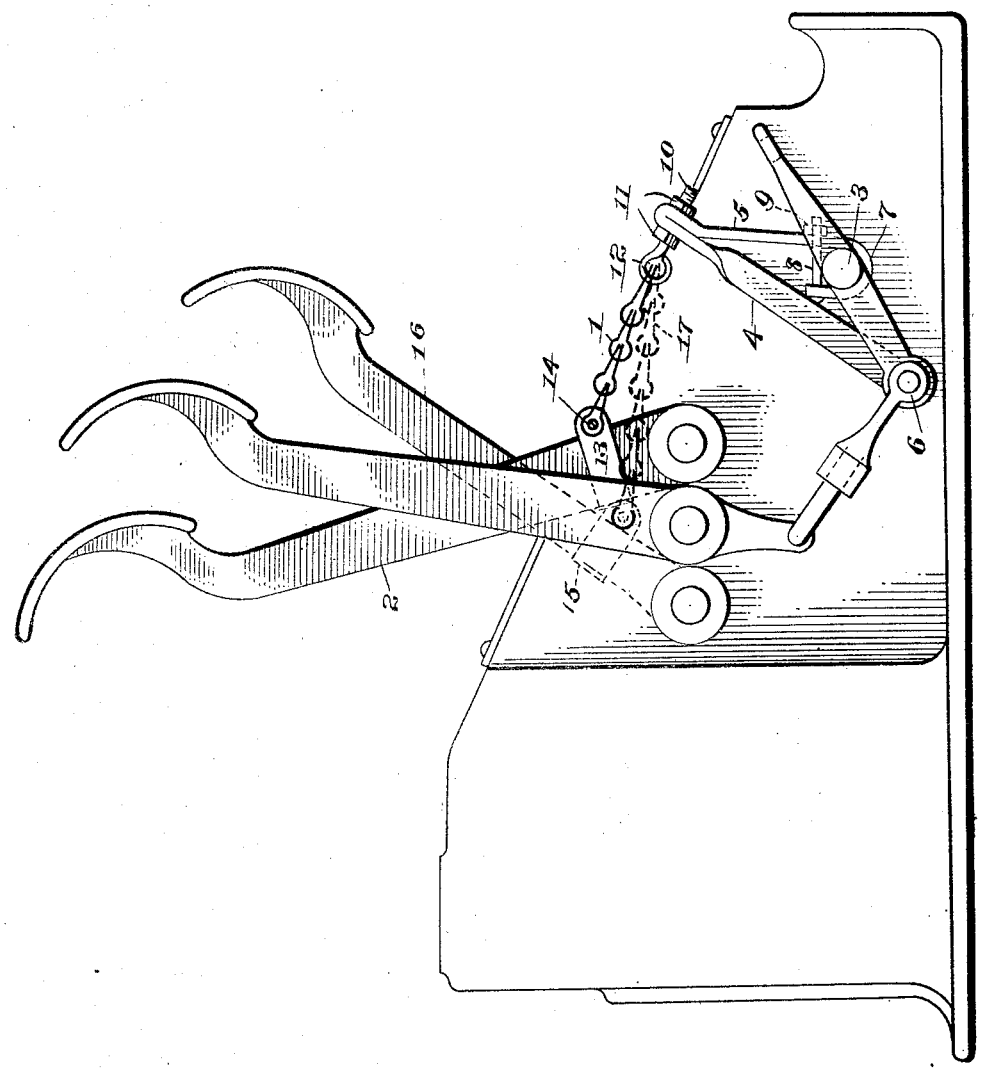
Harry L. Lambert Inventor
By (signature) Attorney Patented Aug. 18, 1925.

1,550,548

UNITED STATES PATENT OFFICE.

HARRY L. LAMBERT, OF ITHACA, NEW YORK, ASSIGNOR, BY DIRECT AND MESNE ASSIGNMENTS, TO THE NEVER STALL CO., A CORPORATION OF NEW YORK.

AUTOMOBILE TRANSMISSION.

Application filed September 12, 1924. Serial No. 737,274.

*To all whom it may concern:*

Be it known that I, HARRY L. LAMBERT, a citizen of the United States, residing at Ithaca, in the county of Tompkins and State of New York, have invented certain new and useful Improvements in Automobile Transmissions, of which the following is a specification.

This invention relates to automobile transmission mechanism, and it relates particularly to the Ford type of transmission.

In the various attachments for and modifications of constructions of Ford transmissions, having for their objects generally the simplifying of the operation of applying the foot brake, the general purpose is to move the clutch into the necessary neutral position, automatically, by pressure on the foot brake pedal. In these attachments and modifications, while the required shifting of the clutch mechanism, when the foot brake pedal is pressed, is generally accomplished as required, the parts employed are usually of such a rigid or complicated character and so disposed as to interfere with or hamper the ordinary operations caused by independent movements of the clutch pedal. The majority of the attachments, etc., referred to interfere with the placing of the clutch in low speed position, and are also incapable of use when a self starter is applied to the Ford transmission.

The purpose of my invention is to provide an attachment whereby the brake pedal of a transmission of the kind referred to shall be connected to the clutch mechanism in a manner to insure the movement of the clutch to the required neutral position by the application of pressure to the brake pedal, which attachment shall be of such form and so located with respect to the operative parts, particularly the clutch pedal and parts operated thereby, as not to interfere with or hamper the independent ordinary operations of such parts.

The attachment which I have produced, while of advantage to all operators of Ford automobiles, is particularly useful to drivers accustomed to automobiles having the general form of transmission, because by its use in the act of stopping the automobile such drivers are relieved of the more numerous manipulations of the parts of the Ford transmission which are peculiar to it. By my device the necessity of holding the clutch pedal in neutral position with one foot while the brake is applied with the other is avoided.

The invention consists of an attachment having the novel features of construction and arrangement of the parts substantially as hereinafter described and claimed, and in which an essential and advantageous feature is a flexible connection between the brake pedal and the clutch mechanism. By this form of connection, while the operation of applying the foot brake moves the clutch to neutral position, the independent operations of the clutch pedal and of the parts connected therewith are in no way interfered with.

In the drawing a side view of the pedals forming parts of a Ford automobile transmission, with my attachment applied thereto, are shown, the parts being shown in their normal positions with the clutch in high speed position.

The attachment consists essentially of a flexible body, such as a chain 1, for connecting the foot brake pedal 2 with the clutch lever shaft 3, the parts being so disposed that when pressure is applied to the pedal the shaft will be rotated a distance to place the clutch in neutral position. The flexible connection may be held in place for use, be rendered capable of adjustment, and be connected to the foot brake pedal and the clutch lever shaft by any suitable means, the means herein shown being capable of wide modification without departing from the scope of the invention.

In the embodiment of the invention herein shown a bracket consisting of the arms 4 and 5 is employed for connecting one end of the flexible connection 1 to the clutch lever shaft. The arm 4 has in its lower end an opening which receives the clutch lever clevis 6 and to which it is attached in a manner to allow vibration of the arm. The lower end of the arm 5 of the bracket is provided with means for detachably securing it rigidly to the clutch lever shaft. As herein shown the connection is made by bending the end of the arm back upon itself, forming a socket 7 for the shaft, and by passing a screw bolt 8 through the end and through the body of the arm. By the use of the nut 9 of the bolt the socket may be clamped around the shaft to effect the required rigid connection.

The upper end of the bracket has in it an opening receiving a bolt 10 one end of which is screw threaded, the other end having an eye 12 for receiving one end of the chain 1. The screw threaded portion of the bolt extends on opposite sides of the bracket and through the adjusting nuts 11, 11, which are disposed one on each side of the bracket, and which provide means for adjusting the length of the connection between the brake pedal and the bracket, and for imparting to the chain the taut position assumed by it when the parts are in their normal positions.

The end of the chain opposite to that connected to the adjustable bolt 10 is connected to the foot brake pedal by a clamp 13 inclosing the pedal and having a binding screw 14 by means of which the clamp may be secured to the pedal in the required operative position.

From the foregoing the operation of the attachment will be clear. The connection between the parts being secured in place in proper position, a forward movement of the brake pedal will result in rotating the clutch lever shaft a distance to place the clutch in neutral position, irrespective of the position of the clutch mechanism at the time of application of the brake, thus effecting the stopping of the automobile by one operation. By the use of the flexible connection, which may with advantage be composed of a chain, as herein shown, a very simple and cheap construction is obtained with the distinct advantage that the connection offers no resistance or interference to the independent operation of the clutch pedal in obtaining high or low speed of the automobile, or in placing the clutch in neutral position, and without, of course, causing any movement of the brake pedal. When the clutch pedal is in high speed position, the chain 1 of the attachment is taut, ready for use in the event that the foot brake pedal is operated, as shown in the drawing. Should the clutch pedal be pushed forward to either a neutral or a low speed position the chain simply loops downward and offers no obstruction to the operation of the pedal.

While I have particularly described a connection between the foot brake pedal and the clutch operating means, it will be clear that if desired, the foot reverse pedal may with advantage also be connected to the clutch mechanism, in order that when the reverse pedal is pushed forward, the clutch is moved to a neutral position. This may be accomplished by the means shown by the dotted lines in the drawing. It consists of a clamp 15, attached to the reverse pedal 16, and a chain 17, connecting the clamp and the vibratory bracket, which in turn is connected to the clutch mechanism.

I claim:

1. An attachment for automobile transmissions of the kind referred to, comprising a bracket having two arms, means for connecting one arm of the bracket loosely to the clutch lever, means for connecting the other arm rigidly to the clutch shaft, and flexible means for connecting the bracket to a foot-operated pedal.

2. An attachment for automobile transmissions of the kind referred to, comprising a bracket having two arms, means for connecting one arm of the bracket loosely to the clutch lever, and means consisting of a bent end forming a socket and a binding screw, for connecting the other arm rigidly to the clutch shaft, and flexible means for connecting the bracket and a foot-operated pedal.

3. An attachment for automobile transmissions of the kind referred to, comprising a bracket having two arms, means for connecting one arm loosely to the clutch lever, means for connecting the other arm rigidly to the clutch shaft, flexible means for connecting the bracket and a foot-operated pedal, and means for adjusting the length of the flexible connection.

In testimony whereof I affix my signature.

HARRY L. LAMBERT.